Patented Dec. 12, 1933

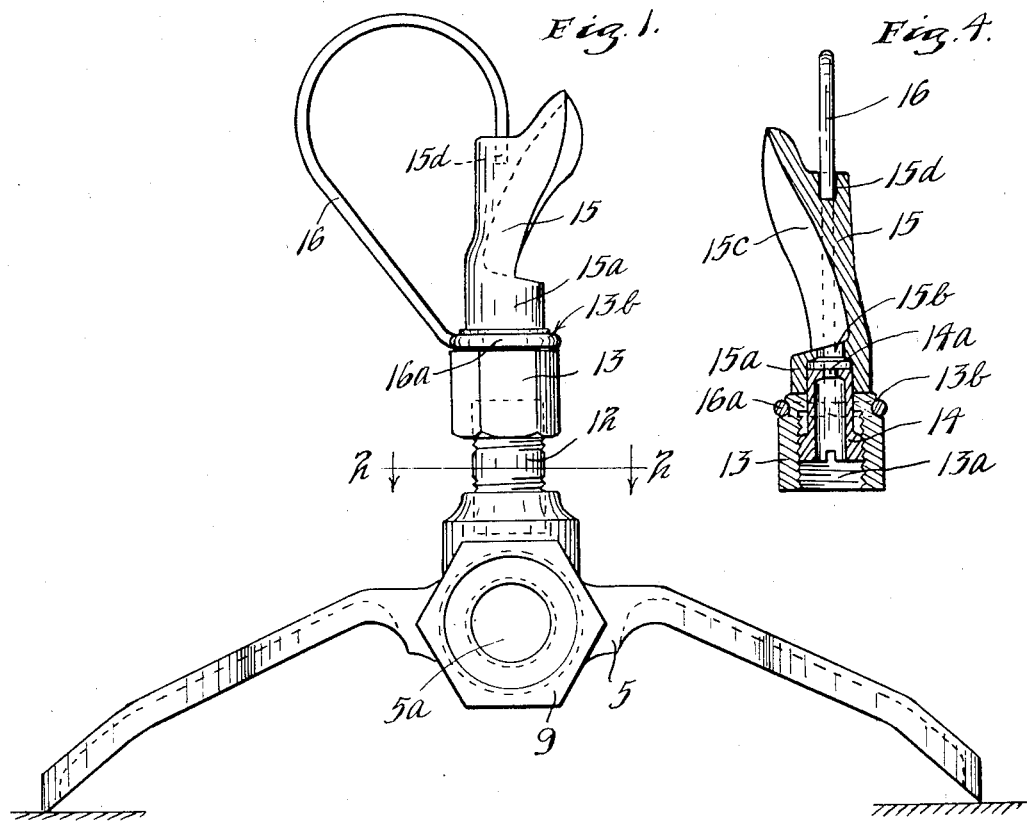
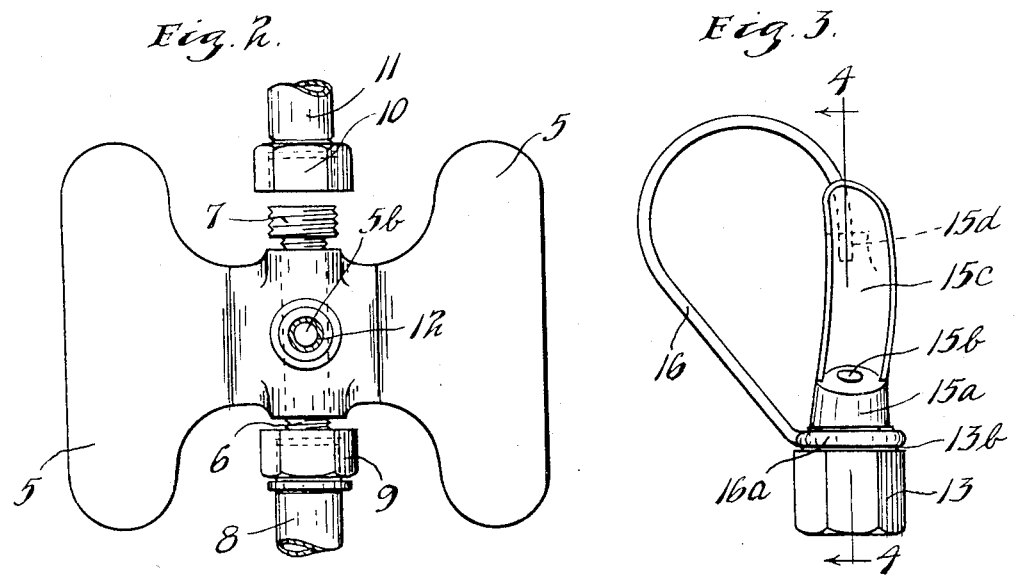

1,938,837

UNITED STATES PATENT OFFICE 1,938,837

SPRINKLER

Carl P. Ittner, Anoka, Minn.

Application April 29, 1932. Serial No. 608,200

3 Claims. (Cl. 299—126)

This invention relates to sprinklers for water and other liquids.

It is an object of this invention to provide a sprinkler including a rotor against which liquid may play to cause rotation of the same and to distribute the liquid onto a circular patch of ground, which rotor is supported to permit the same to rotate with a minimum of friction.

Another object is to provide in such a sprinkler means for supporting the rotor to permit very easy rotation thereof without allowing the support to block travel of liquid to all points in a circular area surrounding the sprinkler.

The objects and advantages of the invention will more fully appear from the following description made in connection with the accompanying drawing, wherein like reference characters refer to the same or similar parts throughout the various views, and, in which, Fig. 1 is a view in front elevation of a sprinkler embodying the invention;

Fig. 2 is a horizontal section taken on the line 2—2 of Fig. 1, as indicated by the arrows;

Fig. 3 is a view in side elevation of the sprinkler head, the rotor being shown in a different position than in Fig. 1; and Fig. 4 is a vertical section taken on the line 4—4 of Fig. 3, as indicated by the arrows.

Referring to the drawing, there is provided a suitable stand 5 having a central horizontal hub apertured to form a horizontal passage 5a for water or other liquid. A vertical hub joins the horizontal hub at the center thereof and a vertical aperture is provided in the vertical hub to form a liquid passage 5b joining the passage 5a. Suitable nipples 6 and 7 are mounted in the ends of the horizontal passage 5a and a hose 8 may be connected by a suitable coupling 9 to the nipple 6, while, if desired, the nipple 7 may be closed by a plug or cap (not illustrated), or a coupling 10, to which a pipe or hose 11 is attached, may be connected to the nipple 7. If the pipe or hose 11 and the coupling 10 are used, this pipe or hose may be connected to other stands 5 of other sprinklers.

Secured to the central hub of the stand 5 and projecting upwardly therefrom is a short pipe 12 on the upper end of which is screwed a nut 13 forming a base on which a rotor spoon 15 is mounted. Nut 13 has a large screw-threaded interior bore in communication with the pipe 12, and this large bore which may be designated 13a communicates with a smaller bore through the upper end of the nut. A nozzle 14 is screwed within the bore 13a and this nozzle has a pin-like portion which projects upwardly through the smaller bore in the upper end of the nut 13 and projects some little distance above the nut. The nozzle 14 is provided with a small opening 14a adjacent its upper end. The rotor spoon 15 has a recessed hub 15a at its lower end within the recess of which the upper end of the nozzle 14 is received. The nozzle, accordingly, acting in conjunction with the top surface of the nut 13, forms a journal or bearing upon which the rotor spoon 15 may revolve. An opening 15b is provided through the hub 15a of the rotor spoon immediately above the nozzle and above this opening the surface of the rotor spoon is of concave shape and projects diagonally upwardly and outwardly from the hub 15a. The concave surface of the spoon may be designated by the numeral 15c. This surface, as shown, has a somewhat spiral contour relative to the axis of rotation of the rotor spoon. A small recess 15d is provided in the upper end of the rotor spoon in axial alinement with the central longitudinal axis of the nozzle 14. It should be here stated that the rotor spoon 15 is preferably formed from babbitt or other metal commonly used as a metal for making bearings. It should also be noted that the recessed hub 15a of the spoon practically completely encompasses both the top of the nozzle 14 and the portions of the sides of the nozzle projecting above the nut 13.

The nut 13 has a circular groove 13b formed in its periphery adjacent its upper end. There is provided an arm 16 composed of spring wire and this arm has an eye 16a formed at its lower end which is mounted for rotation in the groove 13b. From the eye 16a, the arm 16 projects upwardly and outwardly from the nut 13 to give clearance for free rotation of the rotor spoon 15 and the upper portion of the arm after projecting above the spoon 15, is curved downwardly and the upper end of the arm is brought into axial alinement with the axis of rotation of the spoon and is received within the recess 15b. The arm 16, accordingly, forms an upper bearing or journal for the rotor spoon 15.

When in use as a water sprinkler, water will be delivered from the hose 8 through the two passages 5a and 5b and pipe 12 to the bore 13a of nut 13, whereupon the water will pass through the nozzle 14 to issue in a fast stream from the small nozzle opening 14a. The water will pass through the opening 15b in the recessed hub 15a of the rotor spoon and will strike the concave surface 15c of the spoon to rapidly rotate the rotor spoon and at the same time to cause distribution of the water from the spoon in a swirl, so that a circular section of ground about the sprinkler, will be sprayed with water. As the water is deflected from the spoon, some of it will strike the wire arm 16. The water does not run outwardly from the spoon along lines radial to the turning axis of the spoon. Consequently the water spray strikes arm 16 with greater force at one side of a vertical plane taken radially through the axis of rotation of spoon 15 and centrally through the arm than at the other side of said plane. There is, therefore, a moment of force exerted on arm 16 by the spray which urges the arm to rotate in the direction of rotation of the spoon. This moment of force is sufficient to actually rotate the arm 16 slowly. The arm 16 will accordingly change its position and due to this movement of the arm, the arm will not block the path of the water to all portions of a circular patch of ground surrounding the sprinkler. If the arm 16 had no rotation, a sector of ground surrounding the sprinkler would receive no water.

As the water issues from the nozzle 14 and strikes the surface 15c of the rotor spoon, the spoon tends to rise from the top surface of the nut 15, and as the arm 16 has considerable resiliency, this rising movement is permitted against the resilient tension of the arm to a certain limited extent. The water issuing from the nozzle then forms a lubricating layer between the upper portion of the nozzle 14 and the recessed hub 15a of the rotor spoon, and the rotor spoon accordingly revolves on what may be called a lower water lubricated bearing. The upper bearing formed by the upper end of the arm 16 offers very slight resistance to the rotation of the spoon 15, both because of the resiliency of the arm 16 and also due to the fact that the rotor spoon is made from babbitt or other analogous material of the type from which bearings are made. The babbitt construction of the rotor spoon also assists in causing the spoon to rotate freely about the upper end of the nozzle 14.

The nozzle 14 is provided with teeth at diametrically opposite points to receive the end of a tool, such as a screw driver, and thus permit adjustment of the nozzle in the nut 13 to and from the upper end of the spring arm 16. Also if it is desired to vary the size of the opening 14a in the nozzle, to place the water issuing from the nozzle at greater or less pressure to best suit the sprinkler for use in connection with different water systems, the particular nozzle 14 used may be removed and another nozzle having a larger or smaller opening 14a may be substituted therefor. As the hub 15a of the rotor spoon practically completely embraces the upper end of the nozzle, this hub acts to prevent dust, dirt or other small particles of matter from accumulating between the nozzle 14 and the portion of the spoon 15 surrounding the same to interfere with the free rotation of the spoon.

For irrigation purposes or for certain types of sprinkling work, it may be desirable to connect a number of the sprinklers of the invention in series and this, of course, can be readily done due to the construction of the stand. When only one sprinkler is used, a cap or plug will be applied to the nipple 7.

It will be seen that an exceedingly simple and efficient sprinkler has been provided. The parts are few and the assembly of the device is easy. The sprinkler has been successfully demonstrated in actual practice.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A sprinkler comprising a base having a liquid passage therethrough, a single arm consisting of a single piece of wire having one end portion rotatably mounted on said base and having the other end portion disposed opposite and in spaced relation from the outlet of said passage, and a rotor spoon, a bearing thereon rotatably received on said base to prevent lateral motion of said rotor spoon, said rotor spoon disposed between the end portion of said arm and said base and against which water running through the passage may play, the said last named end portion of said arm bearing against and seated within said rotor spoon and acting as a journal therefor, and the portion of said arm between said end portions being outwardly disposed from said rotor spoon.

2. The sprinkler as defined by claim 1 in which the said first named end portion of said arm loosely encircles the said base to provide for rotation of said arm with respect to said base.

3. A sprinkler comprising a base having a projection provided with a liquid passage therethrough, a single arm consisting of a single piece of wire having one end portion rotatably mounted on said base and having the other end portion disposed opposite and in spaced relation from the outlet of said passage, a rotor provided with a channel formed to disperse a liquid stream issuing from said passage and to cause rotation of said spoon by the reaction of said stream, the portion of said rotor opposite said channel being rotatably received over said projection on said base, said rotor being disposed between the other end portion of said arm and said base, the said last named end portion of said arm bearing against and seated within said rotor spoon and acting as a pivot therefor, and the portion of said arm between said end portions being outwardly disposed from said rotor.

CARL P. ITTNER.